United States Patent [19]

Saxena

[11] Patent Number: 5,338,335

[45] Date of Patent: Aug. 16, 1994

[54] METHOD FOR TREATMENT OF OIL CONTAMINATED FILINGS OF MAGNESIUM AND MAGNESIUM ALLOYS

[75] Inventor: Surendra K. Saxena, Trondheim, Norway

[73] Assignee: Norsk Hydro a.s., Oslo, Norway

[21] Appl. No.: 905,533

[22] Filed: Jun. 29, 1992

[30] Foreign Application Priority Data

Jun. 28, 1991 [NO] Norway .................................. 912548

[51] Int. Cl.$^5$ ............................ C22B 1/00; F27B 15/00
[52] U.S. Cl. ........................................ 75/403; 432/58
[58] Field of Search ........................... 75/403; 432/58

[56] References Cited

U.S. PATENT DOCUMENTS

| | | | |
|---|---|---|---|
| 2,299,043 | 10/1942 | Stern | 75/403 |
| 3,650,830 | 3/1972 | Mathis | 134/19 |
| 3,833,343 | 9/1974 | Holowaty et al. | 428/457 |
| 4,016,003 | 4/1977 | Stauffer | 134/19 |
| 4,141,373 | 2/1979 | Kartanson | 75/403 |
| 4,260,373 | 4/1981 | Felinor et al. | 432/110 |
| 4,508,564 | 4/1985 | Kennedy | 75/65 R |
| 4,721,457 | 1/1988 | Areaux et al. | 432/58 |
| 5,036,170 | 7/1991 | Arabei et al. | 219/10.41 |

FOREIGN PATENT DOCUMENTS

| | | |
|---|---|---|
| 0241668 | 10/1987 | European Pat. Off. .. |
| 0373673 | 6/1990 | European Pat. Off. .. |
| 704223 | 3/1941 | Fed. Rep. of Germany . |
| 744048 | 1/1944 | Fed. Rep. of Germany . |
| 1814471 | 6/1970 | Fed. Rep. of Germany . |
| 2522659 | 11/1976 | Fed. Rep. of Germany . |
| 3315557 | 10/1984 | Fed. Rep. of Germany . |
| 3706684 | 12/1989 | Fed. Rep. of Germany . |
| 4028541 | 2/1992 | Fed. Rep. of Germany . |
| 403179 | 12/1933 | United Kingdom . |
| 1299118 | 12/1972 | United Kingdom . |

*Primary Examiner*—Peter D. Rosenberg
*Attorney, Agent, or Firm*—Wenderoth, Lind & Ponack

[57] ABSTRACT

A method for the treatment of waste products, in particular oil-contaminated chips of reactive metals such as magnesium and magnesium alloys includes heading the chips to a temperature close to or above the boiling point of the oil and below the melting point of the metal. Preferably, a closed, cylindrical rotating furnace having inner, slanting blades/wings on the wall of a furnace is used. Chips are fed from a container via a transporting device into the furnace. A closed outlet system conducts the chips from the furnace. Oil vapour is conducted out of the furnace and is coalesced.

17 Claims, 2 Drawing Sheets

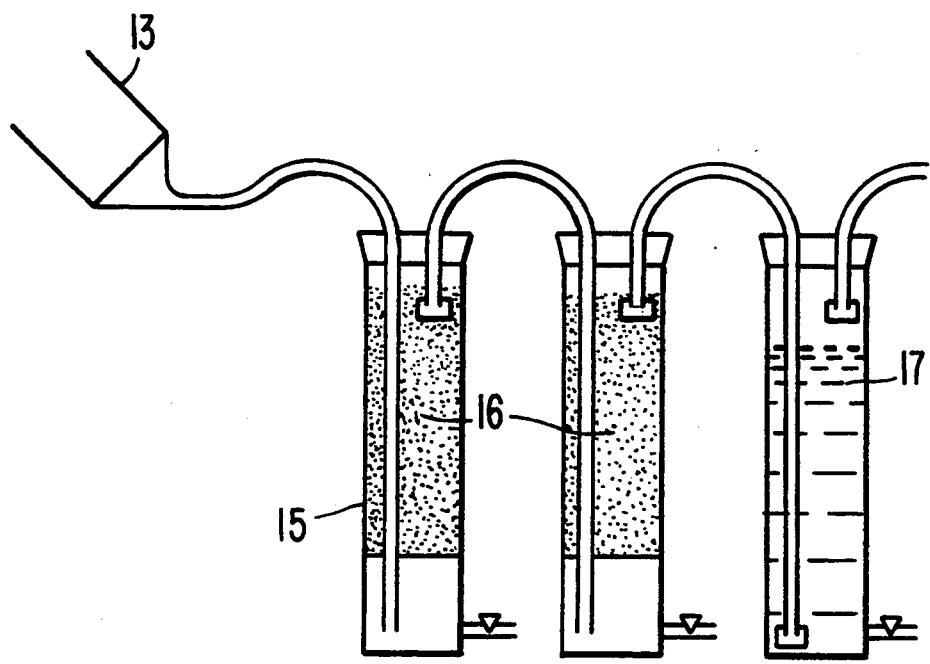

METHOD FOR TREATMENT OF OIL CONTAMINATED FILINGS OF MAGNESIUM AND MAGNESIUM ALLOYS

BACKGROUND OF THE INVENTION

The invention relates to a method for the treatment of waste products, in particular waste products of reactive metals which are contaminated with oil and oleaginous cooling agents, and to an apparatus for carrying out such method.

When metals are machined, a number of waste products are automatically produced in the form of particles or chips, e.g. fillings turnings, borings or machining chips. In the machining of reactive metals, for example magnesium and magnesium alloys, oil or oil containing cooling fluids are employed. The machined chips will therefore be contaminated with oil. This constitutes a serious environmental problem for the users since there is virtually no commercial utilization for oil-contaminated chips today. It is costly for the users to deposit the waste. For this reason it would be desirable for as much as possible of this waste product to be recovered, but the oil in conjunction with highly inflammable magnesium chips presents problems. Remelting of the oil-contaminated chips has been attempted, but this method is not recommended as such chips burn and, to a certain extent, also cause magnesium melting loss. The oil must therefore be removed before any remelting is undertaken.

A usual recovery process which can be used for brass or aluminum chips is centrifuging and/or washing of the chips with a subsequent drying process. Such a process is described in U.S. Pat. No. 4,721,457. Concerning more reactive metals, such as magnesium and magnesium alloys, this method is not suitable. The magnesium reacts with water, releasing hydrogen, which is hazardous. Furthermore, the surface of the chip will be oxidized so that the product will become even less suitable for recovery than it was at the start. The oil content in the washed product will also be relatively high, approximately 0.5–1%.

The use of solvents will remove the oil from the oil-coated chips quite well. However, this is an expensive method and not very acceptable from an environmental point of view.

Previously there have also been methods based on thermal removal of oil. German published application No. 2 522 659 sets out a method of recovering grinding chips from nickel and chromium alloyed steel. The chips, which can contain up to 20% oil, are first centrifuged. Thereafter the oil is vaporized by means of induction heating and is recovered by distillation.

Magnesium chips are a material which has to be handled with great care due to its pyrophoric characteristics. Magnesium is inflammable in the presence of oxygen, and increasing temperatures also increase the vapour pressure. In ordinary use the heating of magnesium to above 200° C. is considered hazardous.

SUMMARY OF THE INVENTION

The object of the invention is to recover metal chips of the above type, especially those of reactive metals such as magnesium and magnesium alloys, by removing oil by a environment-friendly process to a level which makes them suitable for remelting or for the production of high grade products.

Such object of the invention is achieved by means of the method and apparatus described below, and the application is characterized and defined in the attached claims.

Surprisingly it was discovered that it is possible to use thermal treatment as a safe and efficient way of removing residual oil. from magnesium chips. The chips are heated in air without the addition of external reducing gas, but the atmosphere around the particles will be reduced due to the oil which evaporates and to a certain extent is broken down. If so desired, inert gas can also be added. The temperature is kept close to or above the boiling point of the oil and lower than the melting point of the metal. Preferably the temperature should be kept lower than 430° C., and the best temperature range is 200°–410° C. Some of the oil will be cracked and will provide a protective coating of carbon on the magnesium chips. Surprisingly it was found that this coating makes it possible to expose the chips to direct contact with air while they are hot, without the risk of ignition. It is preferred to keep the chips in free/continuous movement during the heat treatment. The method is also suitable for removing volatile components (including remains of lacquer and paint) from magnesium chips and/or from other types of reactive metal chips.

Preferably, a closed, rotating furnace is used for the treatment of the oil-contaminated chips. The material is supplied by means of a feeding device. The furnace has inner blades/wings for forwarding the material and is equipped with a central pipe for measurement of temperature and, if necessary, addition of inert gas. The furnace is equipped with a pressure-regulating system in its outlet and has a closed outlet system for removal of the finished dry material. Oil vapour leaves the furnace, is condensed and separated into an individual unit. The furnace is heated by electricity, but other means of heating may be used.

BRIEF DESCRIPTION OF THE DRAWINGS

The invention will be described in more detail with reference to the attached drawings, wherein

FIG. 2 is a schematic view of an arrangement for the condensation and separation. of oil from waste gases.

DETAILED DESCRIPTION OF THE INVENTION

Figure 1:
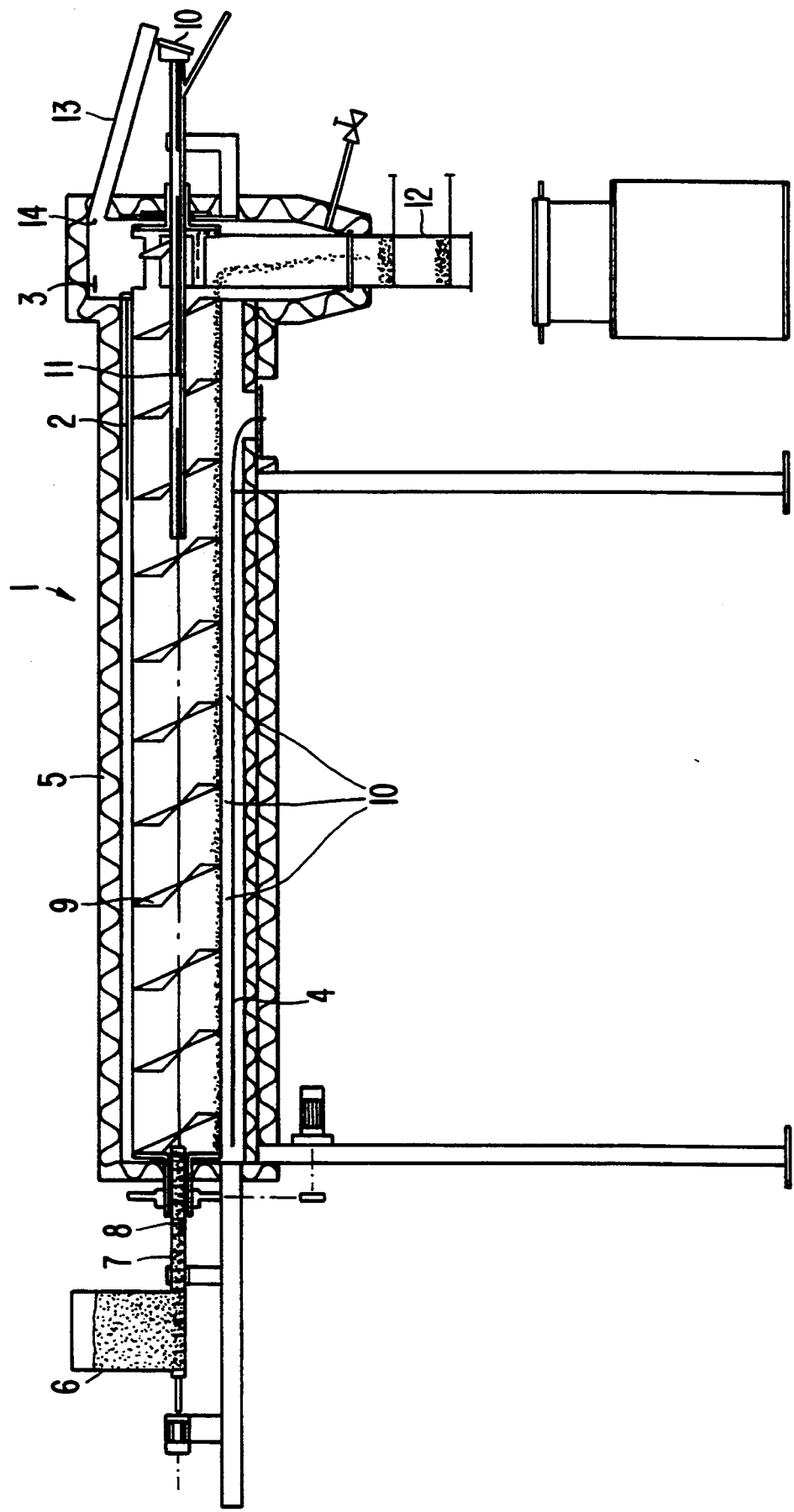
FIG. 1 is a schematic elevation view of a pilot plant with a closed rotating furnace to be used for the removal of oil and/or oil containing substances from magnesium chips.

Turnings, borings and/or machining chips of magnesium or alloys with magnesium content can have varying shapes and sizes in the range of 1/10 mm to 30 mm with a varying content of oil. The surfaces of such products are rough, so that the oil sticks in grooves therein and is difficult to remove. Ordinary mineral oils are used for cooling magnesium chips so as to prevent magnesium melting loss and oxidation. To remove the oil the chips are firstly centrifuged. For a given magnesium chip the centrifuging produces a virtually constant amount of residual oil between approximately 7–15%.

Magnesium chips are a product that is handled with great care due to explosion hazard characteristics thereof. There has therefore been great prejudice against heating material with a magnesium content. However, it was surprisingly found that it was possible to remove oil from the magnesium chips by means of heating, without causing ignition. Furthermore, it was found that when removing oil by means of heating, the particles achieve a protective coating. This coating is advantageous in the future use of the chips as it passivizes the metal and thus prevents direct contact between the magnesium metal and oxygen in the air.

The optimal temperature for heating must first be decided. This was done in the laboratory by heating a small amount of material in a closed tubular furnace without the addition of argon or other inert gas. The most usual cooling oils used in machining of magnesium are based on mineral oils and have boiling points in the range of 250°–300° C. As an example can be mentioned VACMUL 03C (Mobil Muster) with a boiling point at 280° C. The experiments were carried out at a temperature range between 200° and 430° C. The sample was taken out and inspected during the course of the experiment. At temperatures $\geq 410°$ C. the material was completely oxidized and it was necessary to have an inert atmosphere in the furnace.

On the basis of these preliminary experiments carried out in the air, it was decided that the best temperature range for a thermal process in air atmosphere would be a temperature close to or above the boiling point of the oil and lower than the melting point of the metal. For magnesium and magnesium alloys this would be in the area of approximately 200°–410° C. When inert gas is used, the upper temperature limit can be increased somewhat, but this is a question of what is most economical. Experiments on a larger scale were also carried out. The procedure will be described in the following examples.

EXAMPLE 1

For all the large-scale experiments, a dryer/calcining furnace with a volume of $2m^3$ was used. About 30 kg of oil-contaminated magnesium chips were first centrifuged so that they contained between 5–8% oil. The chips were divided between eight trays with a layer of 5–6 cm of chips on each tray. The furnace was heated gradually. At 120° C. the oil started to fume and the furnace was kept at 200° C. until most of the oil had evaporated (approximately 2 two hours). The furnace was then heated to 350° C. and kept at that temperature for three hours. The furnace was thereafter turned off and the chips were left in the furnace until the next day. The temperature was approximately 50° C. when the chips were taken out. The chips had developed a yellowish brown surface. The magnesium chips had very uneven surfaces and there was magnesium oxide in all the cracks or grooves therein. Further analysis of the treated chips showed that the surfaces thereof were covered, to a varying degree, by a mixture of C and MgO. During the treatment/evaporation of the oil, a small amount of the oil is decomposed so that carbon is formed where the oil is concentrated, and purely magnesium surfaces will always be covered by a C-coating. This caused the surfaces of the chips to be passive. The remaining content of oil was also analyzed and found to be in a range of less than 0.01%.

EXAMPLE 2

A corresponding test to the one described in Example 1 was also carried out with direct heating from room temperature to 350° C. in the course of 3–4 hours. Based on the product that had been obtained from the first test, it was desired to find out whether the treated and hot chips could be exposed to air without first being cooled. The magnesium chips were therefore taken straight from the furnace at 350° C. Surprisingly, no magnesium melting loss or oxidation of the chips was observed. The chips had developed even, yellowish brown surfaces and had virtually the same content of residual oil as described previously.

Both the heating time and heating temperature will depend on the amount of material and the air circulation in the furnace. The chips have poor heat conductivity due to their outer coatings and due to the fact that their surfaces is are porous and uneven. Tests were made both with chips of pure magnesium and with alloys containing 91% magnesium, with virtually the same results even in an air atmosphere close to the chips. In the furnace, there will be a reducing atmosphere close to the chips, due to the presence of evaporating oil. This will prevent the metal from oxidizing. Some of the oil will decompose and carbon will be deposited on the chips. Inert gas can also be added if so desired, making it possible to treat the chips at slightly higher temperatures.

In an industrial application, it is preferable to remove oil and any other volatile substances from the chips by a rapid and continuous process. This can be done by using a unit of the type shown in FIGS. 1-2. FIG. 1 shows a pilot plant with a closed rotating tubular furnace 1 designed for removal of oil from, for example, magnesium alloy chips. The furnace is approximately 2 m in length and has a diameter of 200 mm. The furnace is heated by three heating elements 2,3,4 and has outer insulation 5. Metal chips are fed into the furnace from a container 6 via a feed pipe 7 with a screw feeder 8. It is possible to use a conveyor belt and/or some other device for feeding the chips into the furnace. The metal in the container/feed pipe prevents uncontrolled air from entering the furnace. The furnace is equipped with inner transport device such as slanting blades/wings 9 for forwarding the metal. The angle of the blades and the rotation speed will determine the flow rate of the metal chips. When the furnace is rotated, the metal chips will be transported towards the outlet of the furnace. The rotation speed can be varied. It is important that the chips can move freely without local congestion. The furnace will be heated to 300°–400° C.

Several thermocouples 10 are used for regulating the temperature in the furnace. At the outlet end of the furnace there is a pipe 11 for temperature measurement and possible supply of inert gas such as argon. As there is little access of air in the process, no/little addition of argon is necessary. Even if it is attempted to have a completely airtight furnace, a certain amount of oxygen can be allowed to infiltrate as there will not be any direct contact between the magnesium metal or alloys and the oxygen, because the metal chips acquire an outer, passive coating during drying.

The treated metal chips are conducted out of the furnace through a closed outlet system 12 to prevent the entrance of air. It is also an advantage to use a screw device to guide the chips out of the furnace continuously. Oil vapour and other volatile substances leave the furnace through a pipe 13 leading to a cooling/condensing system as shown in FIG. 2. At the outlet of the furnace there is a pressure sensor 14 to prevent high or low pressure at the end of the furnace. If the pressure exceeds atmospheric pressure, a vacuum pump will be started automatically. This is to make it possible to check that only oil vapour, etc. escapes through the outlet pipe 13.

FIG. 2 shows a collection system for oil vapour. The oil vapour from the outlet pipe 13 is guided through a cooler and through three columns 15 for condensing-/removal of the oil. A vacuum pump is used to ensure the passage of the vapour. The first two columns are filled with steel wool 16 or other similar material for coalescence of the oil vapour. Condensed oil can be tapped from the bases of the columns. The last traces of oil can, for example, be removed by bubbling of the gas through a NaOH solution 17.

EXAMPLE 3

Several tests were carried out with a furnace as shown in FIG. 1, with a length of approximately 2 meters and a diameter of 200 mm. Chips of magnesium alloy were first centrifuged and had an oil content of 5.2% to 7.5%. The supply rate for the chips was varied between 0.1 and 0.5 liters per minute. The temperature in the furnace was varied from 350° to 370° C. Treatment periods varying from 5 to 20 minutes were tried. The results from the tests are shown in Table 1. The oil content in the chips was reduced to 0.05% and there was good separation of oil from the waste gas. The final oil content in the chips can be further regulated by changing the length of time in the hot zone, which is affected by rotation speed and length of furnace, among other things.

Nowadays it has also become more usual to use cooling fluids consisting of an emulsion of water/oil. A common ratio is 1-10% oil and the rest water. After centrifuging, chips that have been exposed to such cooling fluids will also contain 1-2% water. In the case of chips that also contain water, separate vaporization of the water is recommended before the oil is removed. By heating to approximately 110° C. the water will vaporize but not the oil. The chips are then fed into the dryer.

The chips will subsequently be suitable for use in desulphurizing of molten iron.

Although this invention has primarily been described by the use of examples for the treatment of reactive metals and alloys, it can also be used for the treatment of other types of chips.

I claim:

1. A method for removing volatile material from volatile material-contaminated chips of reactive or inflammable metals, said method comprising;
   introducing said contaminated chips into a closed system and maintaining said chips continuously in motion within said system;
   maintaining substantially a normal air atmosphere within said system without the addition thereto of external reducing gas; and
   indirectly heating said chips within said system to a temperature close to or above the boiling point of said volatile material but lower than 430° C., thereby causing evaporation of said volatile material such that said chips are left substantially free of said volatile material, and thereby causing coating of said chips with a thin layer of carbonaceous material resulting from said evaporation and thus protecting said chips from contact with air.

2. A method as claimed in claim 1, comprising continuously introducing contaminated chips into said closed system, continuously moving said chips through said closed system while performing said heating thereof, and continuously discharging from said closed system said coated chips substantially free of said volatile material.

3. A method as claimed in claim 2, wherein said closed system comprises a rotating tubular furnace having inlet and outlet ends, and said moving comprises continuously forwarding said chips from said inlet end to said outlet end by a transport device within said furnace.

4. A method as claimed in claim 3, further comprising recovering the evaporated volatile material from said furnace.

5. A method as claimed in claim 1, wherein said recovering comprises feeding vapors of said evaporated volatile material from said outlet end to a condenser and thereat condensing said vapors.

6. A method as claimed in claim 5, comprising feeding said vapors to said condenser by an inert gas.

TABLE 1

| No. | Supply rate | Treatment Temp. °C. | Treatment Time, min | Oil in chips Before | Oil in chips After | Oil recovery from waste gas Bad | Oil recovery from waste gas Sufficient | Oil recovery from waste gas Good |
|---|---|---|---|---|---|---|---|---|
| 1 | 0.1 | ~350 | 20 | ~5.2 | 0.66 | |———————| | . |
| 2 | 0.1 | ~360 | 10 | ~5.2 | 0.09 | |————| |————| . |
| 3 | 0.1 | ~360 | 10 | ~5.2 | 0.09 | . |————| |————| . |
| 4 | 0.1 | ~360 | 20 | ~7.5 | 0.65 | |————| |————| . |
| 5 | 0.1 | ~360 | 10 | ~7.5 | 0.44 | |.————| |————| . |
| 6 | 0.25 | ~350 | 10 | ~5.2 | 0.9 | . | |———————— |
| 7 | 0.25 | ~350 | 15 | ~5.2 | 0.15 | . | |———————— |
| 8 | 0.25 | ~355 | 10 | ~7.5 | 0.84 | . | |———————— |
| 9 | 0.25 | ~355 | 15 | ~7.5 | 0.20 | . | |———————— |
| 10 | 0.25 | ~370 | 5 | ~7.5 | 0.25 | . | |———————— |
| 11 | 0.25 | ~370 | 10 | ~7.5 | 0.1 | . | |———————— |
| 12 | 0.50 | ~370 | 10 | ~7.5 | 0.10 | . | |———————— |
| 13 | 0.50 | ~370 | 15 | ~7.5 | 0.05 | . | |———————— |

7. A method as claimed in claim 4, comprising maintaining said outlet end at a pressure of approximately one atmosphere.

8. A method as claimed in claim 1, further comprising introducing a small amount of inert gas into said closed system.

9. A method as claimed in claim 1, wherein said metal comprises magnesium or a magnesium alloy.

10. A method as claimed in claim 1, wherein said volatile material comprises oil.

11. A method as claimed in claim 1, wherein said temperature is from 200°–410° C.

12. A method as claimed in claim 1, wherein said evaporation creates a reducing atmosphere immediately adjacent said chips.

13. A method as claimed in claim 1, further comprising recovering the evaporated volatile material said closed system.

14. A method as claimed in claim 13, wherein said recovering comprises feeding vapors of said evaporated volatile material from an outlet of said closed system to a condenser and thereat condensing said vapors.

15. A method as claimed in claim 14, comprising feeding said vapors to said condenser by an inert gas.

16. A method as claimed in claim 14, comprising maintaining said outlet at a pressure of approximately one atmosphere.

17. A method as claimed in claim 1, further comprising maintaining the interior of said closed system at a pressure of approximately one atmosphere.

* * * * *